March 5, 1963
T. PRIMICH
3,079,842
CUTTING TOOL
Filed Sept. 12, 1960
2 Sheets-Sheet 1
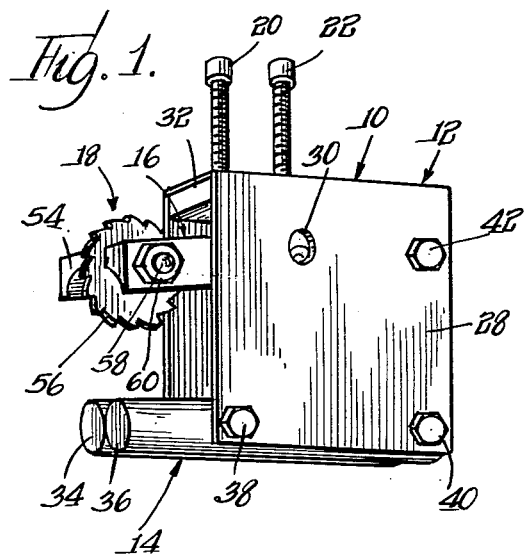
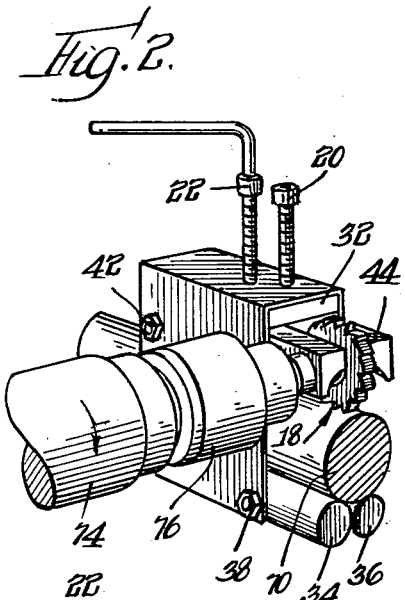
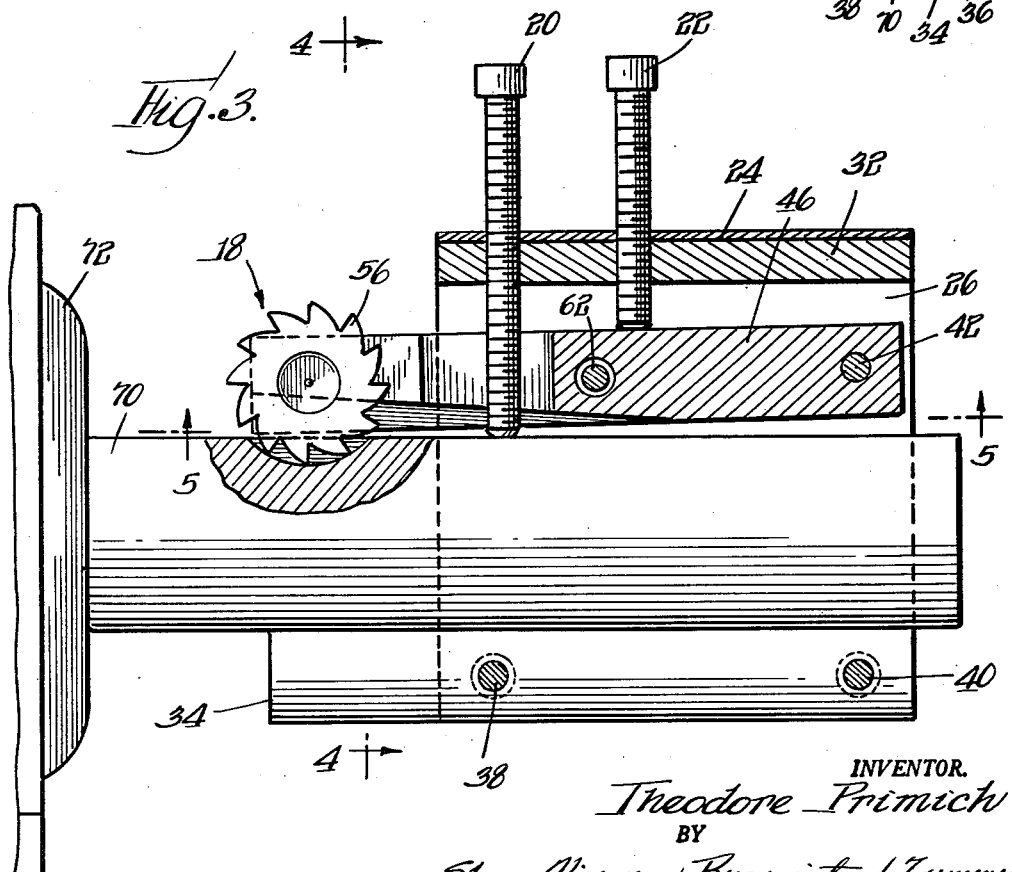
INVENTOR.
Theodore Primich
BY
Stone, Nieman, Burmeister & Zummer
Attys.

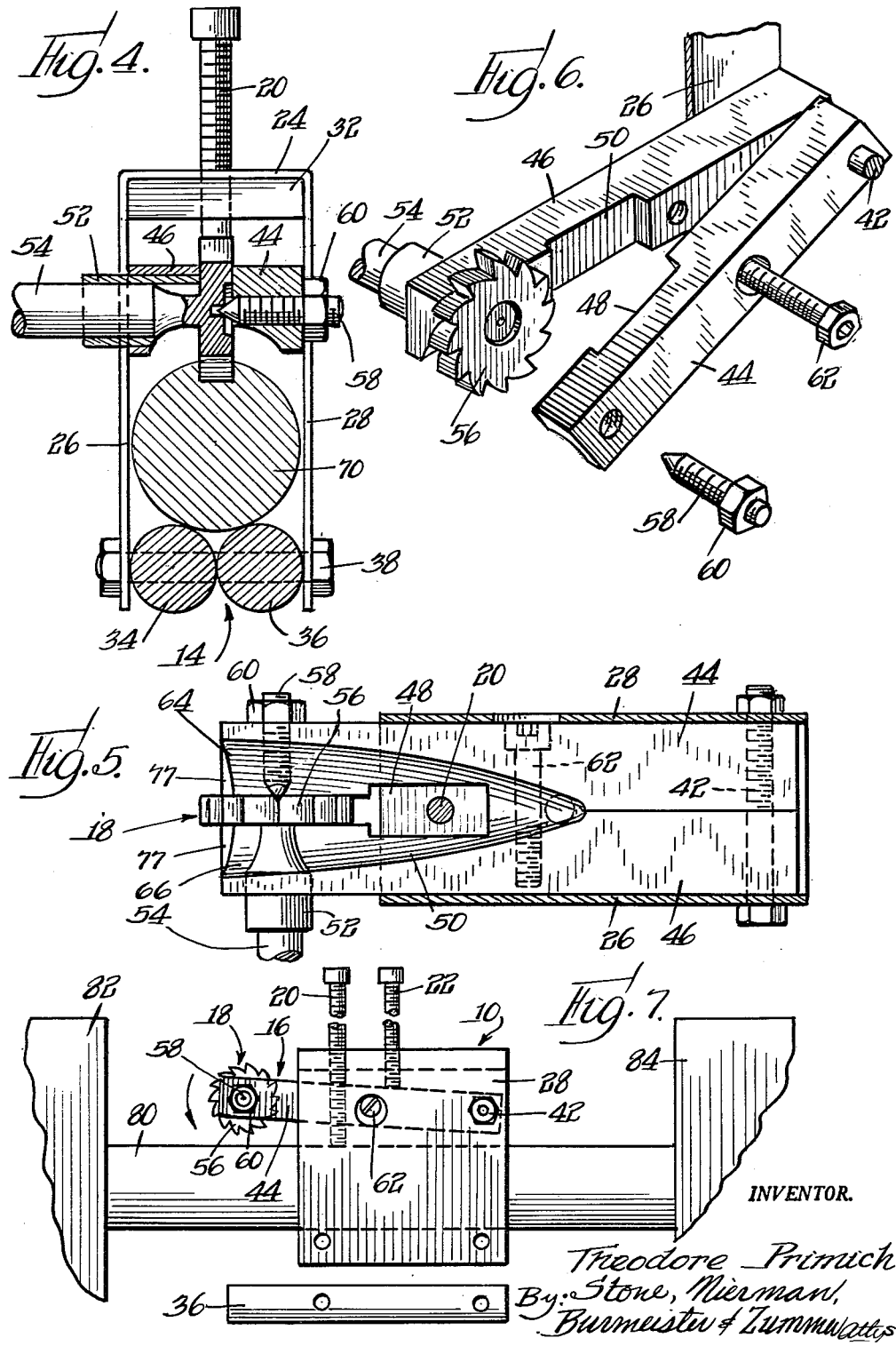

3,079,842
CUTTING TOOL
Theodore Primich, 1937 W. 61st Place, Gary, Ind.
Filed Sept. 12, 1960, Ser. No. 55,440
12 Claims. (Cl. 90—12)

This invention relates to a cutting tool, and more particularly to a tool for cutting Woodruff key seats into shafts while the shafts remain mounted in substantially their operative position.

Shafts which have cooperative members keyed to them often have the key seats in the shafts become enlarged by long usage so that the keys develop play. The usual remedy for correcting an enlarged key seat is to cut another key seat into the shaft and replace the key with a new key.

However, in the case of machinery of substantial size, it is a very difficult and time-consuming process to remove the shaft from the balance of the mechanism in order to take the shaft to a machine shop or to a mill to cut a new key seat in the shaft, as has heretofore been done.

It is the principal object of the present invention to provide a portable key seat cutter for cutting key seats for Woodruff keys which is inexpensive to manufacture and simple to use.

It is another object of the invention to provide a portable key seat cutter which may be used with cutters of various sizes for cutting key seats for various sized Woodruff keys.

It is a still further object of the present invention to provide a portable key seat cutter which is capable of accurately cutting a key seat into a shaft while the shaft remains mounted on opposite ends or for cutting a key seat between other members mounted on the shaft without removing the members.

Other objects and advantages of the invention, some having use beyond the original objects of the invention, will become readily apparent to those skilled in the art on perusal of the appended specification in light of the drawings in which:

FIGURE 1 is a perspective view of a portable key seat cutter tool embodying the present invention;

FIGURE 2 is a perspective view of the key seat cutter tool shown in FIGURE 1 from another aspect, with a portable drill (partially shown) attached to the cutter tool and showing the cutter tool mounted on a shaft for cutting a key seat into the shaft;

FIGURE 3 is a cross-sectional view of the key seat cutter tool shown in FIGURES 1 and 2 showing the device applied to a shaft extending from a machine with a key seat partially cut into the shaft;

FIGURE 4 is a partial cross-sectional view taken on line 4—4 of FIGURE 3;

FIGURE 5 is a partial cross-sectional view taken on line 5—5 of FIGURE 3 showing the interior of the key seat cutter tool;

FIGURE 6 is a perspective view of a yoke and cutter assembly constituting a portion of the tool, partially disassembled; and FIGURE 7 is a side elevation showing the device in the course of being applied to a shaft between portions of a mechanism which make the location of the key inaccessible from the end of the shaft.

Referring now to the drawings, and especially to FIGURE 1, a portable Woodruff key seat cutter tool generally indicated by numeral 10 consists of a housing 12 with a centering block assembly 14 mounted in the bottom of the housing, with a more or less V-shaped recess extending longitudinally, a yoke 16 pivotally mounted in the housing for rotation in the longitudinal plane, a cutter 18 rotatably mounted in the yoke, a clamping screw 20 threadedly mounted vertically in the housing and passing through the yoke and a yoke control screw 22 threadedly mounted in the housing and engaging the yoke.

The housing has a generally U-shaped cross-section with the centering block extending between the arms of the U. The housing has a top 24 with sidewalls 26 and 28 formed integrally with the top and forming the arms of the U. The sidewall 28 has a screw aperture 30 formed therein for reasons which will become apparent hereinafter. The housing is completed by a top block 32 which is welded to the top 24 to provide both rigidity and a means for threadedly mounting the screws 20 and 22 as will be described hereinafter.

The centering block, secured between the lower ends of the sidewalls 26 and 28, consists of a pair of identical rods 34 and 36 each of which has a circular cross-section, the combined diameter of the two rods being equal to the distance between the sidewalls 26 and 28. The rods 34 and 36 are removably secured to the sidewalls by bolts 38 and 40 which extend through the sidewalls and both rods. In a manner which will be described in detail hereinafter, the rods provide a means for centering a shaft in the tool so that cutter 18 is aligned with the center of the shaft to provide a true radial cut into the shaft.

The yoke which is pivotally mounted between sidewalls 26 and 28 is mounted on a yoke pivot pin 42 which is removably mounted in the two sidewalls. The yoke includes a pair of yoke arms 44 and 46; each of the arms has a pivot pin aperture receiving the pivot pin 42. A clamping screw recess 48 is defined in yoke arm 44 and a similar recess 50 is defined in arm 46. When the two yoke arms are placed adjacent to each other, as they are in their normal operating position, a clamp opening is defined as may be seen in FIGURE 5 to allow the clamping screw 20 to pass through the yoke. The yoke arm 46 has a sleeve bearing 52 brazed onto it adjacent to the end of the arm opposite the end receiving the pivot pin 42. The bearing 52 extends through the arm 46 in a direction parallel to the pivot pin 42, and the cutter 18 is rotatably mounted in the bearing 52 with cutter shaft 54 extending through the bearing 52 and out beyond the bearing for attachment to a source of rotational drive. The cutter has its cutter head 56 positioned between the two yoke arms as may be clearly seen in FIGURE 5 so that the cutter is in the center of the housing. A cutter bearing screw 58 is threadedly mounted in the yoke 44. A screw in this instance has a conical point which engages the center of head 56 to provide a bearing for the head. A lock nut 60 is threadedly mounted on the screw to fix the screw to the yoke arm 44. A yoke lock 62, which in this instance is an Allen head screw, is threadedly mounted in the yoke arm to secure the yoke arms to each other for movement together. The yoke arms 44 and 46 have shaft recesses 64 and 66, respectively, for reasons which will become apparent hereinafter.

Considering now the operation of the instant device with a shaft such as shaft 70 shown in FIGURES 2 and 3, extending from a mechanism 72. As may be seen in FIGURE 4 the shaft is straddled by the housing 12. The shaft is placed between the top and the centering block 14 and the clamping screw 20 is tightened. It may be seen that the clamping screw 20 passes through the clamping opening in the yoke so that the clamping screw engages the shaft 70. As the clamping screw it tightened, the shaft firmly engages the rods 34 and 36. It can be appreciated that regardless of the size of the shaft, the shaft is always centered between the rods 34 and 36 since they are of equal diameter, so that the cutter is always aligned with the center of the shaft.

After the shaft is secured in the instant device, any convenient source of rotational energy is connected to the cutter shaft 54. In this instance a one-half inch electric drill partially shown in FIGURE 2 and indicated as numeral 74 has its chuck 76 secured to the cutter shaft. The electric drill is started to rotate the cutter and the control screw 22 is brought down on the yoke 16 to force the yoke downward so that the cutter cuts into the shaft to cut a key seat in the shaft.

It may be seen in FIGURE 3 that the recessed portions 64 and 66 in the yoke arms allow the cutter to enter the shaft to the full depth of the cutter head extending beyond the cutter shaft. The recesses 64 and 66 are formed with a radius of curvature corresponding to the largest shaft which the device can accommodate, as limited by the width between the walls of the housing; however the outer ends are further bevelled at 77 to permit adequate depth of cut in smaller shafts. When the key seat is completed, the electric drill is turned off and the clamping screw is released so that the device may be removed from the shaft.

When it is desired to change the cutter for one having a different diameter, or to replace the cutter, it is a simple matter to remove the yoke lock 62 from the yoke through aperture 30. The locknut 60 is then loosened and the screw 58 is partially removed so that the yoke arm 44 may be lowered relative to the yoke arm 46. The cutter 18 may be slipped out of bearing 52 and replaced by another cutter. It may be appreciated that in the event that a cutter of a different width is needed, it is a simple matter to remove the pin 42 and replace the yoke with one which has a proper space between the arms to receive the cutter to be used.

Turning now to FIGURE 7, it may be seen how the present device may be used to cut a key seat into a shaft at a point not accessible from the end without removing the shaft. In FIGURE 7 a shaft 80 is shown mounted between elements 82 and 84 (one of which may be the element whose keyed connection to the shaft is being renewed). The bolts 38 and 40 are removed from the housing so that rods 34 and 36 may be removed. When the center block 14 is removed from housing 12, the housing is then placed in position straddling the shaft 80 between members 82 and 84. The rods 34 and 36 are replaced in the housing and the bolts 38 and 40 again installed. It may be seen that the key seat cutter tool may be moved axially or rotationally about the shaft to a desired position. When the key seat cutter is positioned in its desired position the clamping screw 20 is brought into engagement with the shaft 80, as previously described. After the key seat is cut into the shaft the key seat cutter tool is removed from the shaft by reversal of the installation procedure already described.

Although a specific embodiment of the instant invention has been disclosed and described herein, it is readily apparent that those skilled in the art may make various modifications and changes without departing from the spirit and scope of the invention. It is accordingly to be understood that the present invention is limited only by the appended claims.

What is claimed is:

1. A cutter tool for forming key seats and similar purposes comprising, in combination, a centering block, a housing attached to the centering block, the block having a generally V-shaped recess facing into the housing, a yoke pivotally mounted in said housing, a cutter rotatably mounted on said yoke, a first adjustment member threadedly extending through a wall of the housing and centrally engaging the yoke to drive the cutter toward the centering block, and a second adjustment member threadedly engaging the same wall of the housing and having its inner end facing the centering block and free of engagement with the yoke to clamp a shaft in centered position on the block.

2. A portable cutter tool for cutting Woodruff key seats into a shaft and similar purposes comprising, in combination, a housing having a top and a pair of sidewalls formed integral with the top, a top block secured to the top, a pair of identical adjacent longitudinally extending circular rods removably secured to the sidewalls at the lower end thereof providing a centering block to receive a shaft between the rods and the top, a pivot pin removably mounted in the sidewalls adjacent to the top, a yoke having a shaft recess and a clamp opening pivotally mounted on said pivot pin, said yoke including a pair of yoke arms pivotally mounted on said pivot pin, means releasably holding said arms together, one of said yoke arms having a bearing, a cutter having a cutter shaft rotatably mounted in said bearing, a clamping screw threadedly mounted in the top block extending through the clamp opening in the yoke and engageable with a shaft between the rods and the top to secure the shaft in the centering block, and a control screw threadedly mounted in the top block and engageable with the yoke to urge the yoke and the cutter toward the shaft to which the housing is secured.

3. A portable cutter tool for cutting a Woodruff key seat into a shaft and similar purposes comprising, in combination, a housing having a top and a pair of sidewalls, a pair of identical adjacent longitudinally extending circular rods removably secured between the sidewalls at the lower end thereof providing a centering block to receive a shaft between the rods and the top, a pivot pin mounted in the sidewalls adjacent to the top, a yoke pivotally mounted on said pivot pin, a cutter rotatably mounted on said yoke, a clamping screw threadedly mounted in the top and engageable with the shaft between the rods and the top to secure the shaft in the center block, and a control screw threadedly mounted on the top block and engageable with the yoke to urge the yoke and the cutter toward the shaft to which the housing is secured.

4. A portable cutter tool for cutting into a shaft a key seat for a Woodruff key and similar purposes comprising, in combination, a housing, a centering block secured to said housing, a pivot pin mounted in said housing, a yoke pivotally mounted on said pivot pin, said yoke including a pair of yoke arms each pivotally mounted on said pivot pin, means spaced from the pivot pin releasably holding said arms together for movement in unison, one of said yoke arms having a sleeve bearing, a cutter having a shaft rotatably mounted in said bearing between said arms, a bearing pin mounted in the other of said yoke arms and rotatably engaging the end of the shaft of said cutter to support said cutter, means for securing the center block to a workpiece, and means for controlling the movement of the cutter toward the workpiece.

5. A portable cutter for cutting into a shaft a key seat for a Woodruff key and similar purposes comprising, in combination, a housing, said housing having a pair of side walls, a pair of identical adjacent circular rods removably secured to the housing between the side walls providing a centering block to receive a workpiece between the rods, a pivot pin mounted in the side walls, a cutter assembly pivotally mounted on the pivot pin, means for clamping the housing to a workpiece, and means for controlling the movement of the cutter toward the workpiece.

6. A portable cutter for cutting into a shaft a key seat for a Woodruff key and similar purposes comprising, in combination, a housing including a pair of side walls, a centering block attached to said side walls, a pivot pin mounted in the side walls and spaced from the centering block, a yoke pivotally mounted on said pivot pin, a cutter rotatably mounted on the yoke and means for moving the cutter and yoke about the pivot pin toward the centering block, whereby a source of rotational energy may be applied to the cutter to rotate the cutter while the means for moving the cutter toward the centering block moves said cutter toward the centering block.

7. A portable tool comprising a generally U-shaped housing having arms and a cross-member, a workpiece backing member having an inwardly facing generally V-shaped longitudinal recess, removable fastening members extending through the backing member and the outer ends of the arms of the housing, a support pivotally mounted within the housing between inner portions of the arms thereof, a cutter rotatably mounted on the support, a clamping member threadably extending through the cross-member of the housing and free of engagement with the cutter support, and a positioning member threadedly extending through the cross-member of the housing and engaging the support to drive the cutter toward the backing member.

8. The tool of claim 7 wherein the backing member consists of a pair of identical round rods in mutual abutment to center a work-piece.

9. In a portable tool, a cutter-holder comprising a pair of members forming a yoke, a pivot passing through both members, removable fastening means securing the members together at a point spaced from the pivot, a bearing aperture in one of the members parallel with the pivot, a cutter having a cutting portion and a shaft, the cutting portion being on the end of the shaft and the shaft extending through the bearing aperture, and laterally adjustable bearing means on the other member engaging the cutter, whereby the holder is pivotally mounted for driving the cutter when the fastening means is secured, but the members may be relatively rotated for replacement of the cutter upon removal of the fastening means and lateral withdrawal of the bearing means.

10. The tool of claim 7 wherein the pivotally mounted support has an aperture between the pivotal support point and the cutter, the clamping member extending through said aperture, so that a workpiece may be clamped at a point closely adjacent to the cutter.

11. In a portable tool, the structure of claim 9 wherein the adjustable bearing means comprises a cone-ended screw threaded through said other member in alignment with the bearing aperture.

12. In a portable tool, a cutter-holder comprising a pair of members forming a yoke, a pivot passing through both members, removable fastening means securing the members together at a point spaced from the pivot, a bearing aperture in one of the members parallel with the pivot, and a screw threadedly mounted in the other member in alignment with the aperture and having on the end thereof a bearing adapted to engage a cutter within the yoke, whereby a cutter may be mounted for rotation in the yoke when the fastening means is secured, but the members may be relatively rotated for replacement of the cutter upon removal of the fastening means and withdrawal of the screw.

References Cited in the file of this patent
UNITED STATES PATENTS

| | | |
|---|---|---|
| 477,638 | Brewer | June 28, 1892 |
| 663,569 | Grafflin | Dec. 11, 1900 |
| 1,560,034 | Brewer | Nov. 3, 1925 |

OTHER REFERENCES

Publication: Railroad Gazette, "Portable Key Seating Machine," dated Dec. 9, 1887, page 795.